(12) United States Patent
Alidedeoglu et al.

(10) Patent No.: US 10,479,888 B2
(45) Date of Patent: Nov. 19, 2019

(54) POLYBUTYLENE TEREPHTHALATE COMPOSITION WITH IMPROVED HYDROLYTIC STABILITY

(71) Applicant: SABIC Global Technologies B.V., Bergen op Zoom (NL)

(72) Inventors: Husnu Alp Alidedeoglu, Newburgh, IN (US); Yuzhen Yang, Evansville, IN (US); Prashant Kumar, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 65 days.

(21) Appl. No.: 15/736,814

(22) PCT Filed: Jun. 3, 2016

(86) PCT No.: PCT/EP2016/062594
§ 371 (c)(1),
(2) Date: Dec. 15, 2017

(87) PCT Pub. No.: WO2016/202607
PCT Pub. Date: Dec. 12, 2016

(65) Prior Publication Data
US 2018/0163045 A1 Jun. 14, 2018

Related U.S. Application Data

(60) Provisional application No. 62/181,561, filed on Jun. 18, 2015.

(51) Int. Cl.
*C08L 67/02* (2006.01)
*C08G 63/83* (2006.01)
*C08G 63/91* (2006.01)

(52) U.S. Cl.
CPC .......... *C08L 67/02* (2013.01); *C08G 63/83* (2013.01); *C08G 63/916* (2013.01); *C08L 2201/08* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| 5,411,999 A | 5/1995 | Gallucci |
| 6,447,913 B1 | 9/2002 | Watanabe et al. |
| 2008/0246192 A1* | 10/2008 | Kim ........................ C08L 67/02 264/500 |
| 2014/0031454 A1 | 1/2014 | Alidedouglu et al. |
| 2014/0031466 A1 | 1/2014 | Alidedeoglu et al. |
| 2017/0002194 A1* | 1/2017 | Ishikawa ................. C08L 67/02 |

FOREIGN PATENT DOCUMENTS

| CN | 1168777 c | 9/2004 |
| CN | 100434452 C | 3/2006 |
| EP | 1209200 A2 | 5/2002 |
| JP | H07179734 A | 7/1995 |
| JP | 4349147 B2 | 10/2009 |
| JP | 2014118478 A | 6/2014 |
| WO | 2004076524 A1 | 9/2004 |

OTHER PUBLICATIONS

International Search Report and Written Opinion for International Application No. PCT/EP2016/062594, International Filing Date Jun. 3, 2016, dated Aug. 19, 2016, 10 pages.
Journal of Applied Polymer Science, vol. 71, Issue 11, Article first published online: Feb. 4, 1999, 1 page.

* cited by examiner

*Primary Examiner* — Robert T Butcher
(74) *Attorney, Agent, or Firm* — Cantor Colburn LLP

(57) ABSTRACT

The present invention relates to a thermoplastic composition with improved hydrolytic stability, comprising: 30 to 50 percent by weight of a polybutylene terephthalate (PBT) having a carboxylic end group concentration (CEG) of 40 to 120 mmol/kg and an intrinsic viscosity of 0.63 to 0.68 dl/g as measured in a 60:40 phenol/tetrachloroethane; 0.01 to 0.1 percent by weight of a catalyst; 0.01 to 5 percent by weight of an epoxy chain extender; wherein all weight percents are based on the total weight of the composition.

10 Claims, No Drawings

POLYBUTYLENE TEREPHTHALATE COMPOSITION WITH IMPROVED HYDROLYTIC STABILITY

This application is a national stage application of PCT/EP2016/062594 filed Jun. 3, 2016, which claims priority to U.S. Provisional Application No. 62/181,561 filed Jun. 18, 2015, both of which are hereby incorporated by reference in their entirety.

TECHNICAL FIELD OF THE INVENTION

Disclosed are polyalkylene terephthalates compositions characterized by improved hydrolytic stability and processes for preparing the same.

BACKGROUND OF THE INVENTION

Polybutylene terephthalate (PBT) resin is a well-known polyalkylene terephthalate that is semi-crystalline and has several desirable properties alone or in blends. Compared to amorphous resins such as acrylonitrile butadiene styrene (ABS), polycarbonate, and polystyrene, a semi-crystalline resin like PBT can show higher solvent resistance, strength, and stiffness due to the presence of crystalline spherulites in the resin. PBT resin is used in many applications in which its solvent resistance, strength, rigidity, and lubricity are needed, most commonly in durable goods that are formed by injection molding. Through its many blended products, PBT can be tailored to a wide variety of applications, including electronic and communications equipment, computers, televisions, kitchen and household appliances, industrial equipment, lighting systems, gardening and agricultural equipment, pumps, medical devices, food handling systems, handles, power and hand tools, bobbins and spindles, and automotive parts in both under-the-hood and exterior applications. Additionally, PBT is widely used to form electrical connectors.

It is generally known that PBT can be made by reacting 1,4-butanediol (BDO) with terephthalic acid (TPA) or dimethyl terephthalate (DMT) in the presence of a transesterification catalyst. U.S. Pat. Nos. 7,129,301; 6,020,393; 4,328,059, and US Patent Pub. 2005/0113534 A1 disclose various catalysts for the polymerization of polyesters.

Commonly used catalysts for the polymerization of PBT include tetraalkyl titanates. Among the various titanates are tetraisopropyl titanate, tetrabutyl titanate, and tetra(2-ethylhexyl) titanate. For example, JP 60147430 discloses a method of producing polyester by esterifying terephthalic acid, adipic acid and 1,4-butanediol in the presence of a titanium compound and a pentavalent phosphorus compound. U.S. Pat. No. 6,303,738 discloses a process for producing copolyester containing adipic acid in the presence of TYZOR® IAM (available from DuPont), which is prepared through the combination of tetraisopropyl titanate (TPT) and a mixture of butyl phosphate and dibutyl phosphate.

There are several factors that can lower the quality of the PBT resin. First, the catalyst used to prepare PBT is not typically quenched (deactivated) at the end of the polymerization process. Unfortunately, an active catalyst in the resin composition can sometimes lead to undesirable reactions in subsequent processing of the polyalkylene terephthalate. On exposure to high temperature and humidity, blends and compositions containing the polyalkylene terephthalate can exhibit hydrolytic degradation. Another problem associated with the presence of the active catalyst is transesterification, which can lead to loss of mechanical properties. Second, that the carboxylic end group concentration (CEG) of the PBT itself can have a negative impact on the hydrolytic stability of PBT resin. As the CEG of the PBT increases, the hydrolytic stability of the resulting resin decreases. Epoxy chain extenders are been used to rebuild molecular weight as hydrolysis occurs in PBT grades. However, in some instances, the addition of an epoxy chain extender does not succeed in rebuilding molecular weight and hydrolytic stability in the resulting PBT resin is not achieved.

As a result, a need remains for the discovery of processes for making hydrostable PBT resins.

SUMMARY OF THE INVENTION

These and other needs are met by the present invention which is directed to a thermoplastic composition with improved hydrolytic stability, comprising:
  30 to 50 percent by weight of a polybutylene terephthalate (PBT) having a carboxylic end group concentration (CEG) of 40 to 120 mmol/kg and an intrinsic viscosity of 0.63 to 0.68 dl/g as measured in a 60:40 phenol/tetrachloroethane;
  0.01 to 0.1 percent by weight of a catalyst;
  0.01 to 5 percent by weight of an epoxy chain extender.
  wherein all weight percents are based on the total weight of the composition.
  Such thermoplastic composition has a desirable hydrolytic stability.

The thermoplastic composition may for example have a melt volume flow rate as measured by ISO 1133 at 250° C. with 5 kg load and 300 s dwell time of the thermoplastic composition when subjected to 80° C. and 70 percent room humidity after 500 hours of between 40 and 70 $cm^3$/10 min, alternatively between 45 and 65 $cm^3$/10 min, alternatively between 52 and 62 $cm^3$/10 min. The melt volume flow rate percent change compared to the initial melt volume flow rate of the thermoplastic composition may for example be less than 50 percent, alternatively between 10 and 50 percent, alternatively between 20 and 40 percent.

For example, the thermoplastic composition may have a melt volume flow rate as measured by ISO 1133 at 250° C. with 5 kg load and 300 s dwell time of the thermoplastic composition when subjected to 80° C. and 70 percent room humidity after 500 hours of between 40 and 70 $cm^3$/10 min, and the melt volume flow rate percent change compared to the initial melt volume flow rate of the thermoplastic composition may be less than 50 percent.

Alternatively, the thermoplastic composition may have a melt volume flow rate as measured by ISO 1133 at 250° C. with 5 kg load and 300 s dwell time of the thermoplastic composition when subjected to 80° C. and 70 percent room humidity after 500 hours of between 45 and 65 $cm^3$/10 min, and the melt volume flow rate percent change compared to the initial melt volume flow rate of the thermoplastic composition may be between 10 and 50 percent.

Preferably, the thermoplastic composition has a melt volume flow rate as measured by ISO 1133 at 250° C. with 5 kg load and 300 s dwell time of the thermoplastic composition when subjected to 80° C. and 70 percent room humidity after 500 hours of between 52 and 62 $cm^3$/10 min, and the melt volume flow rate percent change compared to the initial melt volume flow rate of the thermoplastic composition is between 20 and 40 percent.

The melt volume flow rate percent change may be understood as the difference between the melt volume flow rate (MVR) determined before and after subjecting the thermoplastic composition to 80° C. and 70 percent room humidity for 500 hours, expressed as percentage of the MVR before subjecting to 80° C. and 70 percent room humidity for 500 hours, such as expressed by the formula:

$$MVR_{change} = \frac{MVR_{after\ 500\ hrs} - MVR_{as\ extruded}}{MVR_{as\ extruded}} * 100\%$$

Wherein:

$MVR_{change}$ is the melt volume flow rate percent change;

$MVR_{as\ extruded}$ is the melt volume flow rate (MVR) determined before subjecting the thermoplastic composition to 80° C. and 70 percent room humidity for 500 hours; and $MVR_{after\ 500\ hrs}$ is the melt volume flow rate (MVR) determined after subjecting the thermoplastic composition to 80° C. and 70 percent room humidity for 500 hours.

The melt volume flow rate (MVR) determined before subjecting the thermoplastic composition to 80° C. and 70 percent room humidity for 500 hours may also be referred to as the initial melt volume flow rate.

The CEG may for example be determined in accordance with ASTM D7409-15. The intrinsic viscosity (IV) may for example be determined in accordance with ASTM D2857-95 (2007).

Hydrolytic stability is usually reflected in a composition's ability to maintain its melt viscosity (melt volume flow rate) over time when exposed to moisture under various conditions. Failure to maintain melt viscosity leads to loss of mechanical properties. Thus, the thermoplastic composition of the invention shows a smaller change in melt volume flow rate over time when subjected to heat and humidity as compared to other samples identical in every respect except that the second polybutylene terephthalate (PBT) has a significantly higher carboxylic end group concentration (CEG) than previously employed PBT materials.

The thermoplastic composition according to the invention may further comprise 10 to 30 percent by weight based on the total weight of the composition of a polybutylene terephthalate (PBT) having a carboxylic end group concentration (CEG) of 40 to 50 mmol/kg an intrinsic viscosity of 1.15 to 1.25 dl/g as measured in a 60:40 phenol/tetrachloroethane.

DETAILED DESCRIPTION OF THE INVENTION

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "approximately." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

Composition

PBT

The composition described herein may comprise a first polybutylene terephthalate (PBT) and a second PBT. The first PBT may have an intrinsic viscosity of 1.2 cm$^3$/g as measured in a 60:40 phenol/tetrachloroethane, such as commercially available VALOX® 315 from SABIC Innovative Plastics.

The second PBT may have a carboxylic end group concentration (CEG) of 40 to 120 mmol/kg and an intrinsic viscosity of 0.63 to 0.68 dL/g as measured in a 60:40 phenol/tetrachloroethane. The second PBT more preferably has a CEG of 40 to 80 mmol/kg, 45-75 mmol/kg, or 47-67 mmol/kg. The second PBT may be prepared by melt polymerization of PBT oligomer. PBT oligomer may be prepared by reacting terephthalic acid and BDO in the presence of a catalyst. Various grades of terephthalic acid may be used, but purified terephthalic acid (PTA) is preferred. Purified PTA is commercially available from a number of vendors and typically contains 10 percent or less of impurities as measured using conventional techniques.

Typically, BDO and PTA are combined in a molar ratio of 6:1 to 2:1 in the presence of a catalyst. More particularly, BDO and TA are combined in a molar ratio of 4.25:1 to 2.95:1 in the presence of TPT. As an example, to achieve an IV of approximately 0.13-0.17 dl/g and a CEG of between 90 and 180 mmol/kg, a BDO to PTA ratio of 3:1 is employed. Alternatively, to achieve an IV of 0.25-0.43 dl/g and a CEG of lower than 20 mmol/kg, a BDO to PTA ratio of 4:1 is employed. The molar ratio of BDO to PTA will vary depending on the desired IV and CEG of the resulting PBT oligomer.

Many catalysts have been identified and can be used in the process, but a particularly preferred catalyst is tetraisopropyl titanate (TPT).

To make PBT oligomer, BDO, PTA, and TPT may be combined and heated to a temperature of approximately 160° C. to 180° C. When the temperature of the reaction mixture is in the range of approximately 160° C. to 180° C., the temperature is gradually raised to approximately 220° C. to 265° C. Ester interchange occurs at approximately 230° C. to 260° C., and is complete when the clearing point is reached based on visual inspection. As used herein, the "clearing point" occurs when the reaction medium becomes homogeneous melt. After the clearing point is reached, the pressure is optionally adjusted reduced to about 50 to 760 mm Hg and the temperature is maintained at about approximately 230° C. to 260° C. for sufficient time to achieve the desired IV and CEG values in the resulting PBT oligomer. At the completion of the reaction, the pressure is returned to atmospheric pressure and the polymer is analyzed. The resulting PBT oligomer can be cooled to a solid, then flaked, powdered, or pelletized, and used to make PBT resin.

The PBT oligomer can be used to make the desired high CEG PBT resin on a laboratory scale, or in a batch or continuous process. On a laboratory scale, the PBT oligomer may be introduced into a three-neck round bottom flask and the flask is placed in an oil bath with the temperature adjusted to approximately 230° C. to 260° C., to melt the PBT oligomer. The PBT oligomer is typically melted at that temperature in 10 minutes while stirring at 260 rpm under nitrogen. At this stage, additional BDO and/or TPT may optionally be added. After achieving a complete melt, the polymerization stage may be conducted at the same temperature with the vacuum adjusted to less than 1 mm Hg for approximately 30 minutes. The reaction may be stopped, the pressure increased to atmospheric pressure, and the polymer sample may be obtained for IV and CEG analysis.

The batch process for preparing high CEG PBT resin may comprise heating at approximately 245-260° C. and 1 atmosphere of pressure PBT oligomer having an intrinsic viscosity (IV) of 0.1 to 0.2 dL/g and a carboxylic acid end group concentration CEG of 90 to 180 mmol/kg until the PBT melts and becomes homogeneous to form melted homogeneous PBT oligomer; wherein the PBT oligomer contains 0 to 300 ppm tetra($C_1$-$C_8$ alkyl) titanate catalyst. The melted PBT oligomer may then be polycondensed by reducing the pressure to approximately 0.1 to 4 mm Hg. while maintaining the temperature at approximately 245-260° C. for a sufficient time to provide PBT having an IV of between 0.55 and 1.20 dL/g.

A continuous process for making PBT resin typically requires an oligomer feeder where PBT oligomer with an IV between approximately 0.10 to 0.35 dl/g and a CEG of between approximately 50 to 250 mmol/kg is loaded as a solid, typically as flaked, pelletized or powdered oligomer.

In the process, the PBT oligomer may be fed as a flaked, powdered or pelletized solid into a melt tank reactor where it is heated until it is melted to achieve a flowable melt. The oligomer may be loaded into the feeder and then the melt tank. The PBT oligomer is converted into a melt in the melt tank by heating at between approximately 220 and 250° C., and 1000 mbar. Depending on the scale, the resulting melt has a flow rate between approximately about 50 and 111 kg/hr and the process volume fluctuates between approximately 15 and 62 L. The residence time in the melt tank may be between approximately 0.20 hour for high flow and 1.5 hours for low flow.

The melted PBT oligomer may then be transferred via a transfer pipe to a continuous stirred tank reactor (CSTR), which is additionally equipped with TPT and BDO feedlines. The pipeline melt temperature may desirably be kept between approximately 220 and 270° C. and a pressure in the transfer line is approximately 10 mbars. Depending on the scale, the flow rate may fluctuate between approximately 50 at low flow and 111 kg/hr at high flow. As the melted oligomer is fed into the CSTR, the melt temperature is adjusted to between approximately 225 and 260° C., the pressure is kept between approximately 40 mbar and 5 mbar, and the residence time is varied between 30 and 360 minutes in the CSTR. The CSTR may additionally be equipped with a flow meter on the overhead from the CSTR to measure the reaction progress coupled with a feedback loop controlling optionally the temperature, absolute pressure, the level of the CSTR, and/or the addition of catalyst or BDO to achieve the desired IV and acid number of the CSTR product.

A second process flow line which is a transfer pipe may transfer melted PBT oligomer from the CSTR into a disc ring reactor (DRR) where it is finished. The pipeline melt temperature is typically between approximately 230 and 270° C. In some embodiments, the pressure in the transfer line is approximately 15 mbars and the flow rate is between approximately 50 and 111 kg/hr. The PBT melt temperature may be kept between 230 and 270° C. The reactor pressure may vary between 0.8 and 5 mbar for different grades. The flow rate may vary between approximately 50 and 111 kg/hr. Depending on the scale, in some embodiments, total residence time based on grades in the DRR varies between approximately 1 to 9 hours.

The DRR used in this process typically is a two shaft reactor with the first shaft having more disc rings than the second shaft, where each of the shafts operate at two different rpm. The first shaft of the DRR has 6 disc rings and typically rotates at approximately 4 to 10 rpm and the second shaft has 3 or 4 disc rings and rotates at approximately 2.2 to 5 rpm. Typically, the first shaft rotates at 4 to 10 rpm and has a tip speed between 0.40 and 0.70 m/s and the distance between the rings of the first shaft is between approximately 60 and 90 mm. The second shaft may rotate at 2.2 to 5.5 rpm and have a tip speed between 0.20 and 0.50 m/s, and the distance between the rings of the second shaft may be between approximately 100 and 130 mm.

Other Components

The thermoplastic composition may comprise at least one reinforcing filler. For example, the reinforcing filler may comprise rigid fibers such as glass fibers, carbon fibers, metal fibers, ceramic fibers or whiskers such as wollastonite, polymeric fibers such as tetrafluoroethylene or aramid fibers, and the like. Glass fibers typically have a modulus of greater than or equal to about 6,800 megaPascals, and can be chopped or continuous. The glass fiber can have various cross-sections, for example, round, trapezoidal, rectangular, square, crescent, bilobal, trilobal, and hexagonal. In one embodiment, glass is preferred, especially glass that is relatively soda free. Fibrous glass filaments comprised of lime-alumino-borosilicate glass, which is also known as "E" glass are often especially preferred. Glass fiber may be added to the composition to greatly increase the flexural modulus and strength, albeit making the product more brittle. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns can be used with a diameter of from 10-15 microns being preferred. In preparing the molding compositions it is convenient to use the fiber in the form of chopped strands of from about ⅛" (3 mm) to about ½" (13 mm) long although roving can also be used. In articles molded from the compositions, the fiber length is typically shorter presumably due to fiber fragmentation during compounding of the composition. The length of such short glass fibers present in final molded compositions is less than about 4 mm. The fibers can be treated with a variety of coupling agents to improve adhesion to the resin matrix. Preferred coupling agents include; amino, epoxy, amide or mercapto functionalized silanes. Organometallic coupling agents, for example, titanium or zirconium based organometallic compounds, can also be used. Other preferred sizing-coated glass fibers are commercially available from Owens Corning Fiberglass as, for example, OCF K filament glass fiber 183F.

In another embodiment, long glass fibers can be used, wherein a continuous glass fiber bundle containing thousands of glass fiber monofilaments having a diameter in the range, 6-24 μm, specifically 8-18 μm is impregnated with melted PBT polyester. After cooling, the impregnated bundle is cut into pellets having a length of >5 mm, specifically, above >9 mm, as prepared by the application of a process known as the pullout or pultrusion process. For impregnation, a high flow PCT polyester of the present invention can be used in order to improve the wetting rate of the filaments to make long glass fiber pellets. These pellets can be incorporated into the polyester compositions of the invention, to get long fiber glass-reinforced polyester compositions. The length of long glass fiber present in molded composition prepared by this method is typically greater than that prepared by incorporation of short fibers and predominant portion of the long glass fibers present have a length >4 mm in the molded part. Such long fiber glass reinforced compositions can be used for different molding techniques such as injection molding, compression molding, thermoforming and the like. As in the case of short fibers, the long fibers can also be treated with a variety of coupling agents to improve adhesion to resin. For those skilled in the art, a continuous process such as pushtrusion technique for direct incorporation of long glass fibers in high flow polyester compositions will also be possible.

The glass fibers can be blended first with the polyalkylene terephthalate and then fed to an extruder and the extrudate cut into pellets, or, in a preferred embodiment, they can be separately fed to the feed hopper of an extruder. In a highly preferred embodiment, the glass fibers can be fed downstream in the extruder to minimize attrition of the glass. Generally, for preparing pellets of the composition set forth herein, the extruder is maintained at a temperature of approximately 230° C. to 280° C. The pellets so prepared when cutting the extrudate can be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

In some applications it can be desirable to treat the surface of the fiber, in particular a glass fiber, with a chemical coupling agent to improve adhesion to a thermoplastic resin in the composition. Examples of useful coupling agents are alkoxy silanes and alkoxy zirconates. Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The reinforcing filler, for example a glass fiber, may be present in the composition in an amount from 1 to 60 percent by weight, or 5 to 50 percent by weight, specifically from 10 to 45 percent by weight, more specifically from 20 to 40 percent by weight, and most specifically, from 25 to 35 percent by weight.

In still other embodiments, the compositions optionally additionally comprises a particulate (non-fibrous) organic filler, which can impart additional beneficial properties to the compositions such as thermal stability, increased density, stiffness, and/or texture. Exemplary particulate fillers are inorganic fillers such as alumina, amorphous silica, aluminosilicates, mica, clay, talc, glass flake, glass microspheres, metal oxides such as titanium dioxide, zinc sulfide, ground quartz, and the like.

In some embodiments, the reinforcing filler, for example glass fibers, is used in combination with flat, plate-like filler, for example talc, mica or flaked glass. Typically, the flat, plate-like filler has a length and width at least ten times greater than its thickness, where the thickness is from 1 to about 1000 microns. Combinations of rigid fibrous fillers with flat, plate-like fillers can reduce warp of the molded article. One specific particulate filler is talc, in particular a talc filler having an average largest dimension of less than 50 micrometers. In addition, or in the alternative, the filler can have a median particle size of less than 50 micrometers. In an embodiment, the equivalent spherical diameter of the particle is used to determine particle size. Use of these types of filler provides molded articles having both low shrinkage and a smooth surface finish. Use of these types of filler can also aid the crystallization of the polyester, and increase heat resistance of the composition. Such talc materials are commercially available from Barretts Minerals Inc. under the trade name ULTRATALC® 609.

The thermoplastic composition further comprises a chain extender, such as an epoxy chain extender. Many chain extenders are known and are commercially available. In one embodiment, the thermoplastic composition comprises 1 to 5 percent by weight of a chain extender. The epoxy chain extender used in the thermoplastic composition according to the present invention may for example be selected from 3,4-epoxycyclohexylmethyl-3',4'-epoxycyclohexane carboxylate, bisphenol-A diglycidyl ether, hydrogenated bisphenol-A based epoxies, polyethylene glycol diglycidyl ether, diglycidyl phthalates, fatty acid glycidyl esters, diglycidyl aniline, triglycidyl p-aminophenol, tetraglycicyl diamino diphenyl methane, diglycidyl piperazine, triglycidyl isocyanurate, bisepoxycyclohexyl, glycidyl(meth) acrylate polymers, or combinations thereof. In a particular embodiment, the chain extender is an epoxy chain extender such as 3,4-epoxycyclohexylmethyl-3',4'-epoxycyclohexane carboxylate. More particularly, about 1 to 4 percent by weight of 3,4-epoxycyclohexylmethyl-3',4'-epoxycyclohexane carboxylate are present in the thermoplastic composition of the invention. More particularly, about 1.5 to about 3 percent by weight of 3,4-epoxycyclohexylmethyl-3',4'-epoxycyclohexane carboxylate is present in the thermoplastic composition of the invention.

The thermoplastic composition optionally comprises a hindered phenol stabilizer. Many stabilizers are known and are commercially available. In one embodiment, the thermoplastic composition further comprises 0.01 to 1 percent by weight of a stabilizer. In a particular embodiment, the stabilizer is a hindered phenol stabilizer such as pentaerythritol-tetrakis(3-(3,5-di-tert.butyl-4-hydroxy-phenyl-)propionate), CAS Reg. No. 6683-19-8, which is available from BASF Corp. More particularly, about 0.02 to 0.08 percent by weight of pentaerythritol-tetrakis(3-(3,5-di-tert.butyl-4-hydroxy-phenyl-)propionate) is present in the thermoplastic composition of the invention. More particularly, about 0.03 to 0.07 percent by weight of pentaerythritol-tetrakis(3-(3,5-di-tert.butyl-4-hydroxy-phenyl-)propionate) is present in the thermoplastic composition of the invention.

The thermoplastic composition may comprise a catalyst. Many catalysts are known and are commercially available. The catalyst may for example be one selected from:
  an oxide selected from zinc oxide, magnesium oxide, titanium oxide, or antimony trioxide;
  a borate selected from zinc borate, calcium borate, sodium tetraphenylborate, tetrabutyl ammonium tetraphenylborate, trioctanol borate or triethanol borate;
  a phosphate selected from zinc phosphate, calcium phenyl phosphate, calcium hydroxyapatite, aluminium phosphate, or zinc diethylphosphinate; or
  a carboxylate selected from sodium acetate, zinc acetate, magnesium stearate, calcium stearate, sodium stearate or zinc stearate.

In a preferred embodiment, the catalyst is a carboxylate selected from sodium acetate, zinc acetate, magnesium stearate, calcium stearate, sodium stearate or zinc stearate. The catalyst may for example be present in a quantity of 0.01 and 0.25 wt %, alternatively 0.03 and 0.20 wt %, alternatively 0.05 and 0.15 wt %, with regard to the total weight of the polyester and the chain extending compound.

In one embodiment, the thermoplastic composition further comprises 0.01 to 1 percent by weight of a catalyst. In a particular embodiment, the catalyst is magnesium stearate or sodium stearate. In a particular embodiment, the catalyst is sodium stearate.

The thermoplastic composition may further comprise a mold release agent. Many mold release agents are known and are commercially available. In one embodiment, the thermoplastic composition comprises 0.01 to 20 percent by weight of an mold release agent. In a more particular embodiment, the thermoplastic composition comprises 1 to 20 percent by weight of an mold release agent. In a particular embodiment, the mold release agent is linear low density polyethylene (LLDPE). More particularly, about 1 to 10 percent by weight of LLDPE is present in the thermoplastic composition of the invention. More particularly, about 2 to about 8 percent by weight of LLDPE is present in the thermoplastic composition of the invention.

The thermoplastic composition may optionally comprise other additives. As indicated above, such additives include other mold release agents, fillers, reinforcing agents, antioxidants, hindered phenol stabilizers, light stabilizers, ultraviolet light (UV) absorbers, as well as plasticizers, lubricants, mold release agents, antistatic agents, colorants, blowing agents, melt strength additives, flame retardants, and anti-drip agents.

In addition to the above-described additives, used accessorily in a small amount, depending on the object, other polymers or resins, typically in an amount less than 50 weight percent, specifically less than 30 percent by weight, more specifically less that 20 percent by weight, of the total composition, can be added to the thermoplastic resin composition containing the polyethylene terephthalate. For example, such additional polymers can include polyamides, polyphenylene sulfide, polyphenylene oxide, polyacetal, acrylonitrile-styrene resin, acrylonitrile-butadiene-styrene resin, polysulfone, polyesteramides, polyether sulfone, polyether imide, polyether ketone, fluorine resin, and combinations thereof.

In addition to the first and second polybutylene terephthalate, other polyesters can optionally be present in the composition (in an amount of less than 50 weight percent, specifically less than 30 percent by weight, more specifically less that 20 percent by weight, most specifically less than 10 percent by weight of the total composition, provided that such polyesters do not significantly and adversely affect the desired properties of the composition.

For example, a thermoplastic composition can include, in addition to the polyethylene terephthalate prepared by the present process other aromatic polyesters, cycloaliphatic polyesters, and the like. The additional polyesters can be virgin polyesters or wholly or partially bio-derived, including petroleum-derived aromatic polyesters and bio-derived aromatic polyesters.

EMBODIMENTS

The following presents certain further embodiments of the present invention.

Embodiment 1

A thermoplastic composition with improved hydrolytic stability, comprising:

10 to 30 percent by weight of polybutylene terephthalate (PBT) having a carboxylic end group concentration (CEG) of 40 to 50 mmol/kg an intrinsic viscosity of 1.15 to 1.25 cm$^3$/g as measured in a 60:40 phenol/tetrachloroethane;

30 to 50 percent by weight of a polybutylene terephthalate (PBT) having a carboxylic end group concentration (CEG) of 40 to 120 mmol/kg and an intrinsic viscosity of 0.63 to 0.68 dL/g as measured in a 60:40 phenol/tetrachloroethane;

1 to 60 percent by weight of a reinforcing filler;

0.01 to 0.1 percent by weight of a catalyst;

0.01 to 5 percent by weight of an epoxy chain extender;

wherein the melt volume flow rate as measured by ISO 1133 at 250° C. with 5 kg load and 300 s dwell time of the thermoplastic composition when subjected to 80° C. and 70 percent room humidity after 500 hours is between 52 and 62 cm$^3$/10 min, and the melt volume flow rate percent change compared to the initial melt volume flow rate of the thermoplastic composition is between 20 and 40 percent; and all weight percents are based on the total weight of the composition.

Embodiment 2

The thermoplastic composition of Embodiment 1, wherein the polybutylene terephthalate (PBT) having an intrinsic viscosity of 0.63 to 0.68 dL/g as measured in a 60:40 phenol/tetrachloroethane has a CEG of 40 to 80 mmol/kg, 45-75 mmol/kg, or 47-67 mmol/kg.

Embodiment 3

The thermoplastic composition of Embodiments 1-2, wherein the reinforcing filler is glass fiber.

Embodiment 4

The thermoplastic composition of Embodiments 1-3, comprising 25 to 35 percent by weight of glass fiber.

Embodiment 5

The thermoplastic composition of Embodiments 1-4, wherein the chain extender is 3,4-epoxycyclohexylmethyl-3',4'-epoxycyclohexane carboxylate.

Embodiment 6

The thermoplastic composition of Embodiments 1-5, comprising 1.5 to 3 percent by weight of 3,4-epoxycyclohexylmethyl-3',4'-epoxycyclohexane carboxylate.

Embodiment 7

The thermoplastic composition of Embodiments 1-6, wherein the catalyst is sodium stearate.

Embodiment 8

The thermoplastic composition of Embodiments 1-7, further comprising 0.01 to 1 percent by weight of a hindered phenol stabilizer.

Embodiment 9

The thermoplastic composition of Embodiments 1-8, comprising 0.03 to 0.07 percent by weight of a stabilizer which is pentaerythritol-tetrakis(3-(3,5-di-tert.butyl-4-hydroxy-phenyl)-propionate.

Embodiment 10

The thermoplastic composition of Embodiments 1-9, comprising 0.1 to 10 percent by weight of a mold release agent.

Embodiment 11

The thermoplastic composition of Embodiments 1-10, comprising 2 to 8 percent by weight of a mold release agent which is linear low density polyethylene.

Embodiment 12

The thermoplastic composition of Embodiments 1-11, comprising: 10 to 30 percent by weight of polybutylene terephthalate (PBT) having an intrinsic viscosity of 1.2 cm$^3$/g as measured in a 60:40 phenol/tetrachloroethane;
30 to 50 percent by weight of a polybutylene terephthalate (PBT) having a carboxylic end group concentration (CEG) of 40 to 120 mmol/kg and an intrinsic viscosity of 0.63 to 0.68 dL/g as measured in a 60:40 phenol/tetrachloroethane;
25 to 35 percent by weight of a reinforcing filler; and
0.01 to 3 percent by weight of an epoxy chain extender;
0.01 to 0.1 percent by weight of a hindered phenol stabilizer;
0.01 to 0.1 percent by weight of a catalyst;
0.1 to 10 percent by weight of a mold release agent;
wherein the melt volume flow rate as measured by ISO 1133 at 250° C. with 5 kg load and 300 s dwell time of the thermoplastic composition when subjected to 80° C. and 70 percent room humidity after 500 hours is between 52 and 62 cm$^3$/10 min, and the melt volume flow rate percent change compared to the initial melt volume flow rate of the thermoplastic composition is between 20 and 40 percent; and
all weight percents are based on the total weight of the composition.

Embodiment 13

The thermoplastic composition of Embodiments 1-11, comprising:
10 to 30 percent by weight of polybutylene terephthalate (PBT) having an intrinsic viscosity of 1.2 cm$^3$/g as measured in a 60:40 phenol/tetrachloroethane
30 to 50 percent by weight of a polybutylene terephthalate (PBT) having a carboxylic end group concentration CEG of 40 to 120 mmol/kg and an intrinsic viscosity of 0.63 to 0.68 dL/g as measured in a 60:40 phenol/tetrachloroethane;
25 to 35 percent by weight of glass fiber; and
1.5 to 3 percent by weight of 3,4-epoxycyclohexylmethyl-3',4'-epoxycyclohexane carboxylate;
0.01 to 0.06 percent by weight of pentaerythritol-tetrakis (3-(3,5-di-tert.butyl-4-hydroxy-phenyl)-propionate;
0.01 to 1 percent by weight of sodium stearate;
0.1 to 10 percent by weight of linear low density polyethylene;
wherein the melt volume flow rate as measured by ISO 1133 at 250° C. with 5 kg load and 300 s dwell time of the thermoplastic composition when subjected to 80° C. and 70 percent room humidity after 500 hours is between 52 and 62 cm$^3$/10 min, and the melt volume flow rate percent change compared to the initial melt volume flow rate of the thermoplastic composition is between 20 and 40 percent; and
all weight percents are based on the total weight of the composition.

Embodiment 14

The thermoplastic composition of Embodiments 1-11, comprising:
15 to 25 percent by weight of polybutylene terephthalate (PBT) having an intrinsic viscosity of 1.2 cm$^3$/g as measured in a 60:40 phenol/tetrachloroethane
40 to 50 percent by weight of a polybutylene terephthalate (PBT) having a carboxylic end group concentration (CEG) of 40 to 120 mmol/kg and an intrinsic viscosity of 0.63 to 0.68 dL/g as measured in a 60:40 phenol/tetrachloroethane;
28 to 32 percent by weight of glass fiber; and
0.01 to 0.05 percent by weight of pentaerythritol-tetrakis (3-(3,5-di-tert.butyl-4-hydroxy-phenyl)-propionate;
0.01 to 0.06 percent by weight of sodium stearate;
1.5 to 2 percent by weight of 3,4-epoxycyclohexylmethyl-3',4'-epoxycyclohexane carboxylate;
1 to 8 percent by weight of linear low density polyethylene;
wherein the melt volume flow rate as measured by ISO 1133 at 250° C. with 5 kg load and 300 s dwell time of the thermoplastic composition when subjected to 80° C. and 70 percent room humidity after 500 hours is between 52 and 62 cm$^3$/10 min, and the melt volume flow rate percent change compared to the initial melt volume flow rate of the thermoplastic composition is between 20 and 40 percent; and
all weight percents are based on the total weight of the composition.

EXAMPLES

The following examples illustrate the scope of the invention. The examples and preparations which follow are provided to enable those skilled in the art to more clearly understand and to practice the present invention. They should not be considered as limiting the scope of the invention, but merely as being illustrative and representative thereof.

Materials

Table 1 summarizes the materials that were used.

TABLE 1

| Material | Description/Source |
| --- | --- |
| PBT 315 | Polybutylene Terephthalate (PBT) sold by SABIC Innovative Plastics as VALOX ® 315 with an intrinsic viscosity of 1.2 cm$^3$/g as measured in a 60:40 phenol/tetrachloroethane. |
| PBT I | Polybutylene Terephthalate (PBT) made using dimethyl terephthalate and sold by SABIC Innovative Plastics as VALOX ® 195 with an intrinsic viscosity of 0.66 cm$^3$/g as measured in a 60:40 phenol/tetrachloroethane. |
| PBT II | PBT 195 from prepared using PTA with an intrinsic viscosity of 0.66 cm$^3$/g as measured in a 60:40 phenol/tetrachloroethane. |

TABLE 1-continued

| Material | Description/Source |
|---|---|
| PBT III | Polybutylene Terephthalate (PBT) made using PTA and sold by Chang Chun Plastics (CCP) as PBT 1200D with an intrinsic viscosity of 0.66 cm$^3$/g as measured in a 60:40 phenol/tetrachloroethane |
| STANDARD 10 MICRON PBT GLASS FIBER | STANDARD 10 MICRON PBT GLASS FIBER, CAS Reg. No. 65997-17-3, available as HP3786 from PPG industries INC. |
| CYCLOALIPHATIC EPDXY RESIN | 3,4-Epoxycyclohexylmethyl-3',4'-epoxycyclohexane carboxylate, CAS Reg. No. 2386-87-0, available as Celloxide 2021P from Daicel Chemical Industries. |
| HINDERED PHENOL STABILIZER | Pentaerythritol-tetrakis(3-(3,5-di-tert•butyl-4-hydroxy-phenyl-) propionate), CAS Reg. No. 6683-19-8, available from BASF Corp. |
| Sodium Stearate | CAS Reg. No. 822-16-2, obtained as Sodium Stearate T-1 from Chemtura Corp. |
| LLDPE | Linear low density polyethylene, CAS Reg. No. 25087-34-7, available as NOVAPOL PI-2024-A-LLDPE from Nova Chemicals, Corp. |

Preparation of PBT II

On a pilot plant scale, high CEG PBT II resin can be prepared from PBT oligomer via a continuous process. A continuous process for making PBT resin typically requires an oligomer feeder where PBT oligomer with IV between 0.10-0.35 dl/g and CEG between 50-250 mmol/kg is loaded as a solid, typically as flaked, pelletized or powdered oligomer. In the process, the PBT oligomer is fed as a flaked, powdered or pelletized solid into the melt tank reactor where it is heated until it is melted to achieve a flowable melt. The oligomer is loaded into the feeder and then the melt tank. The PBT oligomer is converted into a melt in the melt tank by heating at between approximately 220 and 250° C., and 1000 mbar. Depending on the scale, the resulting melt has a flow rate between approximately about 50 and 111 kg/hr and the process volume fluctuates between approximately 15 and 62 L. The residence time in the melt tank is between approximately 0.20 hour for high flow and 1.5 hours for low flow.

The melted PBT oligomer is then transferred via a transfer pipe to a continuous stirred tank reactor (CSTR), which is additionally equipped with TPT and BDO feedlines. The pipeline melt temperature is desirably kept between approximately 220 and 270° C. and a pressure in the transfer line is approximately 10 mbars. Depending on the scale, the flow rate fluctuates between approximately 50 at low flow and 111 kg/hr at high flow. As the melted oligomer is fed into the CSTR, the melt temperature is adjusted to between approximately 225 and 260° C., the pressure is kept between approximately 40 mbar and 5 mbar, and the residence time is varied between 30 and 360 minutes in the CSTR. The CSTR is additionally equipped with a flow meter on the overhead from the CSTR to measure the reaction progress coupled with a feedback loop controlling optionally the temperature, absolute pressure, the level of the CSTR, and/or the addition of catalyst or BDO to achieve the desired IV and acid number of the CSTR product.

A second process flow line which is a transfer pipe transfers melted PBT oligomer from the CSTR into the disc ring reactor (DRR). The PBT oligomer is then transferred via transfer pipe to a DRR where it is finished. The pipeline melt temperature is typically between approximately 230 and 270° C. In some embodiments, the pressure in the transfer line is approximately 15 mbars and the flow rate is between approximately 50 and 111 kg/hr. The PBT melt temperature is kept between 230 and 270° C. The reactor pressure varies between 0.8 and 5 mbar for different grades. The flow rate varies between approximately 50 and 111 kg/hr. Depending on the scale, in some embodiments, total residence time based on grades in the DRR varies between approximately 1 to 9 hours.

The DRR used in this process typically is a two shaft reactor with the first shaft having more disc rings than the second shaft, where each of the shafts operate at two different rpm. The first shaft of the DRR has 6 disc rings and typically rotates at approximately 4 to 10 rpm and the second shaft has 3 or 4 disc rings and rotates at approximately 2.2 to 5 rpm. Typically, the first shaft rotates at 4 to 10 rpm and has a tip speed between 0.40 and 0.70 m/s and the distance between the rings of the first shaft is between approximately 60 and 90 mm. The second shaft rotates at 2.2 to 5.5 rpm and has a tip speed between 0.20 and 0.50 m/s, and the distance between the rings of the second shaft is between approximately 100 and 130 mm.

Process Flow Rate: 100 kg/hr

IV and CEG of PBT II Oligomer Used in Continuous Process:

IV=0.13-0.23 dl/g

CEG=130-250 mmol/kg

The results for several continuous process runs are summarized below in Table 2.

TABLE 2

PBT II Resins prepared by Continuous Process

| | Temperature (° C.) | Pressure (mbar) | Level (%) | Residence Time (minutes) | IV (dl/g) | CEG (mmol/kg) |
|---|---|---|---|---|---|---|
| Run 1 | | | | | | |
| Melt Tank | 240.84 | 1000 | 37.14 | 22 | | |
| CSTR | 234.15 | 20 | 29.06 | 190 | | |
| DRR | 245.89 | 0.74 | <5% | | 0.67 | 50 |
| Run 2 | | | | | | |
| Melt Tank | 238.83 | 1000 | 38 | 23 | | |
| CSTR | 235.06 | 20 | 16.45 | 126 | | |
| DRR | 246.14 | 0.78 | 0, 31 | | 0.76 | 43 |
| Run 3 | | | | | | |
| Melt Tank | 242.74 | 1000 | 35.64 | 22 | | |
| CSTR | 240.47 | 20 | 21.85 | 153 | | |
| DRR | 246.24 | 0.74 | 49.63, 50.80 | | 0.64 | 62 |
| Run 4 | | | | | | |
| Melt Tank | 240.98 | 1000 | 37.78 | 23 | | |
| CSTR | 240.93 | 20 | 23.78 | 163 | | |
| DRR | 246.36 | 3.63 | 0, 27.19 | | 0.65 | 59 |

Extrusion, Molding, and Testing

For the compositions disclosed herein, ingredients were tumble blended and then extruded on 27 mm twin-screw extruder, side and rear fed, with a vacuum vented mixing screw, at a barrel and die head temperature between 240 to 265° C. and a 300 rpm screw speed. The extrudate was cooled through a water bath prior to pelletizing. ASTM tensile, Izod and flexural bars were injection molded on a van Dorn molding machine with a set temperature of approximately 240-265° C. The pellets were dried for 3-4 hours at 120° C. in a forced air-circulating oven prior to injection molding.

ASTM tensile, Izod, HDT, flexural, and color chips were injection molded on an 80 ton van Dorn molding machine with a set temperature of approximately 240-265° C. The pellets were dried for 3-4 hours at 120° C. in a forced air-circulating oven prior to injection molding. Each type of sample was individually molded.

Notched and un-notched Izod testing was done on 75 mm×12.5 mm×3.2 mm bars using ASTM method D256 at 23° C., 0° C., and −30° C. using 5 lbf hammer for notched and 10 lbf hammer for un-notched specimens.

Tensile properties were measured according to ASTM D 638 at 23° C. and 50 mm/min speed for 5 mm/min for the examples.

Flexural properties were tested per ASTM D790 with 3.2 mm thickness specimen and 1.27 mm/min speed.

Specific gravity was measured per ASTM D792.

Heat deflection temperature (HDT) was tested per ASTM D648 with 1.82 MPa stress on 3.2 mm thickness specimens.

Melt volume-flow rate (MVR) was tested per ISO 1133 at 250° C. with 5 kg load and 300 s dwell time.

Hydro-Aging Testing for Hydrolytic Stability

Hydro-aging testing was completed at 80° C. and 70% relative humidity. Tensile bars (End gated) and Izod bars were molded according as described above, and three to five bars were placed in the hydro oven for a specific amount of time (approximately 250 to 500 hours). The bars were removed from the oven, wiped clean, and allowed to air dry before tensile/impact testing as described above. Two tensile bars after aging were chopped into small pellets for MVR and molecular weight test. The MVR, MW, tensile and Izod property retention are reported as a percent differential from the results of an unexposed control sample. Each data point is the average of 3 to 5 samples.

Results and Discussion

This study discloses the effect of the carboxylic acid end group concentration (CEG) of PBT (Polybutylene Terephthalate) having an intrinsic viscosity of 0.66 cm$^3$/g as measured in a 60:40 phenol/tetrachloroethane (PBT 195 grade resin) on the hydrolytic stability of 30 percent glass-filled impact-modified PBT compositions grades. Since hydrolysis is acid catalyzed, it is well known that CEG has a negative impact on the hydrolytic stability of PBT resin. As the CEG content increases, the hydrolytic stability of the resin decreases via loss of molecular weight. The use of an epoxy chain extender rebuilds the molecular weight during the course of hydrolysis through reaction with the carboxylic end groups of the PBT chains. The extent of the reaction between the cycloaliphatic chain extender and carboxylic acid end groups increases with the increase of the CEG value for the PBT 195 grade. The hydrolytic stability is surprisingly improved in formulations containing PBT 195 grade with a CEG value of greater than 40 mmol/kg. CEG Range: approximately 49 to 62 mmol/kg.

Resins Employed

PBT 195 resin from various sources was employed in the study. The IV and CEG of the PBT resins tested are provided in Table 3. As can be seen from Table 2, the PBT 195-type resins each showed the same IV and were within the current quality assurance specifications for PBT 195. However, the COOH end group concentration of PBT II resin was much higher than that of PBT I or III.

TABLE 3

Comparison of PBT I, II, and III Resin IV and CEG.

|  | Unit | PBT I (made from DMT) Comparative Example | PBT II (made from TPA) Example | PBT III (made from TPA) Comparative Example |
|---|---|---|---|---|
| IV | dL/g | Approx. 0.63 to 0.68 | Approx. 0.63 to 0.68 | Approx. 0.63 to 0.68 |
| CEG | Mmol/Kg | 18 | Approximately 49-62 | 20 |

Hydrolytic Stability Study

To compare the effect of these three different PBT 195 resins on the hydrolytic stability of the final products, Valox® K4560 from SABIC Innovative Plastics was chosen as the benchmark grade. The formulations that were tested are summarized in Table 4.

TABLE 4

PBT 195 trials in K4560 with/out Epoxy

| Item description | Unit | Comparative Example 1 PBT I + Epoxy | 2 PBT I No Epoxy | Example 3 PBT II + Epoxy | 4 PBT II No Epoxy | Comparative Example 5 PBT III + Epoxy | 6 PBT III No Epoxy |
|---|---|---|---|---|---|---|---|
| VALOX 315 (PBT) | % | 20 | 20 | 20 | 20 | 20 | 20 |
| PBT I | % | 43.21 | 44.91 | — | — | — | — |
| PBT II | % | — | — | 43.21 | 44.91 | — | — |

TABLE 4-continued

PBT 195 trials in K4560 with/out Epoxy

| Item description | Unit | Comparative Example 1 PBT I + Epoxy | Example 2 PBT I No Epoxy | Comparative Example 3 PBT II + Epoxy | Example 4 PBT II No Epoxy | Comparative Example 5 PBT III + Epoxy | Example 6 PBT III No Epoxy |
|---|---|---|---|---|---|---|---|
| PBT III | % | — | — | — | — | 43.21 | 44.91 |
| Standard 10 Micron PBT Glass Fiber | % | 30 | 30 | 30 | 30 | 30 | 30 |
| HINDERED PHENOL STABILIZER | % | 0.04 | 0.04 | 0.04 | 0.04 | 0.04 | 0.04 |
| SODIUM STEARATE T1 | % | 0.05 | 0.05 | 0.05 | 0.05 | 0.05 | 0.05 |
| CYCLOALIPHATIC EPOXY RESIN | % | 1.7 | — | 1.7 | — | 1.7 | — |
| LINEAR LOW DENSITY POLYETHYLENE | % | 5 | 5 | 5 | 5 | 5 | 5 |

In the formulations summarized in Table 4, the epoxy resin in Samples 1, 3, and 5 reacts with PBT resin COOH end groups and effectively functions as a chain extender in the polymer matrix. Hence, the viscosity of the product compositions is maintained after the hydro-aging process.

Since the COOH end group (CEG) concentration is different in the three PBT resins tested (Table 3), we next evaluated the hydrolytic stability of compositions containing these three different types of PBT resin in an hydroaging experiment. Melt-volume flow rate (MVR) was measured before and after hydroaging. The results are listed in Table 5.

TABLE 5

MVR Results Before and After Hydro Aging

| Test | Unit | Comparative Example 1 PBT I + Epoxy | 2 PBT I No Epoxy | Example 3 PBT II + Epoxy | 4 PBT II No Epoxy | Comparative Example 5 PBT III + Epoxy | 6 PBT III No Epoxy |
|---|---|---|---|---|---|---|---|
| MVR as Extruded | cm³/10 min | 44 | 46 | 44 | 45 | 47 | 47 |
| MVR after 250 hrs | cm³/10 min | 76 | 73 | 64 | 103 | 71 | 77 |
| MVR Change after 250 hrs | % | 71 | 58 | 48 | 130 | 52 | 64 |
| MVR after 500 hrs | cm³/10 min | 105 | 97 | 57 | 115 | 76 | 95 |
| MVR Change after 500 hrs | % | 137 | 112 | 31 | 157 | 62 | 103 |

Several important findings are evident from the data in Table 5. Firstly, it can be seen from Table 5 that after 250 hours and 500 hours hydroaging, all of the samples lost viscosity to varying degrees. Under the hydroaging conditions, formulations without the epoxy additives (Samples 2, 4, 6) exhibited worse hydrolytic stability than the epoxy-containing formulations (Samples 1, 3, 5). Secondly and most importantly, for all epoxy containing formulations, the sample containing high CEG PBT II (Sample 3) maintained the MVR the best; that is, this sample exhibited the smallest viscosity change and the hydrolytic stability actually improved over time. As a result, the reaction between the epoxy and the COOH end groups of PBT II was the key for obtaining improved hydrolytic stability. Surprisingly, the higher concentration of COOH end groups, the better hydrolytic stability for the PBT products.

Notched Izod and Tensile retention of Samples 1-6 were also tested. The results are listed in Tables 6 and 7. Table 6 shows that samples containing the PBT II and the epoxy additive (Sample 3) had slightly better Notched Izod retention compared to the other samples. This may also indicate that higher CEG and hence better reaction with epoxy helps to maintain the viscosity of the formulation as well as its mechanical properties.

According to Table 7, the tensile retention did not show substantial differences among the six samples, mainly due to the 30% loading of the glass fibers which is a key contributors to tensile properties

TABLE 6

Notched Izod Retention after Hydro Aging

|  | Unit | PBT I + Epoxy | PBT I No Epoxy | PBT II + Epoxy | PBT II No Epoxy | PBT III + Epoxy | PBT III No Epoxy |
|---|---|---|---|---|---|---|---|
| Notched Izod as molded | J/m | 107 | 112 | 94.3 | 111 | 105 | 110 |
| NII Retention 250 hrs | % | 77.9 | 78.7 | 87.7 | 75.7 | 84.5 | 78.8 |
| NII Retention 500 hrs | % | 74.2 | 73.8 | 87.0 | 67.9 | 77.5 | 69.7 |

TABLE 7

Tensile Retention after Hydro Aging

|  | Unit | PBT I + Epoxy | PBT I No Epoxy | PBT II + Epoxy | PBT II No Epoxy | PBT III + Epoxy | PBT III No Epoxy |
|---|---|---|---|---|---|---|---|
| Tensile Modulus | MPa | 9400 | 9578 | 9204 | 9228 | 8434 | 8864 |
| TM Retention 250 hrs | % | 109.2 | 108.2 | 109.0 | 109.7 | 114.3 | 108.9 |
| TM Retention 500 hrs | % | 107.0 | 109.6 | 105.6 | — | 117.7 | 105.7 |
| Tensile Strength @ Yield | MPa | 127 | 130 | 132 | 131 | 125 | 127 |
| TSY Retention 250 hrs | % | 101.6 | 99.2 | 101.5 | 100.8 | 100.8 | 99.2 |
| TSY Retention 500 hrs | % | 96.9 | 98.5 | 98.5 | X | 102.4 | 93.7 |
| Tensile Elongation @ Break | % | 3.2 | 3.2 | 3.5 | 3.3 | 3.7 | 3.5 |
| TEB Retention 250 hrs | % | 81.3 | 84.4 | 82.9 | 84.8 | 78.4 | 77.1 |
| TEB Retention 500 hrs | % | 75.0 | 84.4 | 80.0 | X | 78.4 | 71.4 |

The foregoing disclosure has been described in some detail by way of illustration and example, for purposes of clarity and understanding. The invention has been described with reference to various specific and preferred embodiments and techniques. However, it should be understood that many variations and modifications can be made while remaining within the spirit and scope of the invention. It will be obvious to one of skill in the art that changes and modifications can be practiced within the scope of the appended claims. Therefore, it is to be understood that the above description is intended to be illustrative and not restrictive. The scope of the invention should, therefore, be determined not with reference to the above description, but should instead be determined with reference to the following appended claims, along with the full scope of equivalents to which such claims are entitled.

The invention claimed is:

1. A thermoplastic composition with improved hydrolytic stability, comprising:
   10 to 30 percent by weight of polybutylene terephthalate (PBT) having a carboxylic end group concentration (CEG) of 40 to 50 mmol/kg, and an intrinsic viscosity of 1.15 to 1.25 dl/g as measured in a 60:40 phenol/tetrachloroethane;
   30 to 50 percent by weight of a polybutylene terephthalate (PBT) having a carboxylic end group concentration (CEG) of 50 to 120 mmol/kg and an intrinsic viscosity of 0.63 to 0.68 dl/g as measured in a 60:40 phenol/tetrachloroethane;
   25 to 35 weight percent of a reinforcing filler;
   0.01 to 0.1 percent by weight of a catalyst;
   0.01 to 5 percent by weight of an epoxy chain extender;
   0.01 to 0.1 percent by weight of a hindered phenol stabilizer; and
   0.1 to 10 percent by weight of a mold release agent;
   wherein all weight percents are based on the total weight of the composition; and
   wherein the melt volume flow rate as measured by ISO 1133 at 250° C. with 5 kg load and 300 s dwell time of the thermoplastic composition when subjected to 80° C. and 70 percent room humidity after 500 hours is between 52 and 62 cm$^3$/10 min, and the melt volume flow rate percent change compared to an initial melt volume flow rate of the thermoplastic composition is between 20 and 40 percent.

2. The thermoplastic composition of claim 1, wherein the polybutylene terephthalate (PBT) having an intrinsic viscosity of 0.63 to 0.68 dl/g as measured in a 60:40 phenol/tetrachloroethane has a CEG of 50 to 80 mmol/kg.

3. The thermoplastic composition of claim 1, wherein the reinforcing filler is glass fiber.

4. The thermoplastic composition of claim 3, comprising 28 to 32 percent by weight of glass fiber.

5. The thermoplastic composition of claim 1, wherein the chain extender is 3,4-epoxycyclohexylmethyl-3',4'-epoxycyclohexane carboxylate.

6. The thermoplastic composition of claim 5, comprising 1.5 to 3 percent by weight of 3,4-epoxycyclohexylmethyl-3',4'-epoxycyclohexane carboxylate.

7. The thermoplastic composition of claim 1, wherein the catalyst is sodium stearate.

8. A thermoplastic composition with improved hydrolytic stability, comprising:
   10 to 30 percent by weight of polybutylene terephthalate (PBT) having a carboxylic end group concentration (CEG) of 40 to 50 mmol/kg, and an intrinsic viscosity of 1.2 cm3/g as measured in a 60:40 phenol/tetrachloroethane;
   30 to 50 percent by weight of a polybutylene terephthalate (PBT) having a carboxylic end group concentration (CEG) of 40 to 120 mmol/kg and an intrinsic viscosity of 0.63 to 0.68 dL/g as measured in a 60:40 phenol/tetrachloroethane;
   25 to 35 percent by weight of a reinforcing filler;
   0.01 to 3 percent by weight of an epoxy chain extender;
   0.01 to 0.1 percent by weight of a hindered phenol stabilizer;
   0.01 to 0.1 percent by weight of a catalyst; and
   0.1 to 10 percent by weight of a mold release agent;
wherein all weight percents are based on the total weight of the composition; and
wherein the melt volume flow rate as measured by ISO 1133 at 250° C. with 5 kg load and 300 s dwell time of the thermoplastic composition when subjected to 80° C. and 70 percent room humidity after 500 hours is between 52 and 62 $cm^3$/10 min, and the melt volume flow rate percent change compared to an initial melt volume flow rate of the thermoplastic composition is between 20 and 40 percent.

9. The thermoplastic composition of claim 1, comprising:
   10 to 30 percent by weight of polybutylene terephthalate (PBT) having an intrinsic viscosity of 1.2 cm3/g as measured in a 60:40 phenol/tetrachloroethane
   30 to 50 percent by weight of the polybutylene terephthalate (PBT) having a carboxylic end group concentration (CEG) of 50 to 120 mmol/kg and an intrinsic viscosity of 0.63 to 0.68 dL/g as measured in a 60:40 phenol/tetrachloroethane;
   25 to 35 percent by weight of glass fiber;
   1.5 to 3 percent by weight of 3,4-epoxycyclohexylmethyl-3',4'-epoxycyclohexane carboxylate;
   0.01 to 0.06 percent by weight of pentaerythritol-tetrakis (3-(3,5-di-tert.butyl-4-hydroxy-phenyl)-propionate;
   0.01 to 1 percent by weight of sodium stearate; and
   0.1 to 10 percent by weight of linear low density polyethylene;
wherein the melt volume flow rate as measured by ISO 1133 at 250° C. with 5 kg load and 300 s dwell time of the thermoplastic composition when subjected to 80° C. and 70 percent room humidity after 500 hours is between 52 and 62 $cm^3$/10 min, and the melt volume flow rate percent change compared to an initial melt volume flow rate of the thermoplastic composition is between 20 and 40 percent.

10. The thermoplastic composition of claim 1, comprising:
   15 to 25 percent by weight of polybutylene terephthalate (PBT) having an intrinsic viscosity of 1.2 $cm^3$/g as measured in a 60:40 phenol/tetrachloroethane
   40 to 50 percent by weight of the polybutylene terephthalate (PBT) having a carboxylic end group concentration (CEG) of 50 to 120 mmol/kg and an intrinsic viscosity of 0.63 to 0.68 dL/g as measured in a 60:40 phenol/tetrachloroethane;
   28 to 32 percent by weight of glass fiber;
   0.01 to 0.05 percent by weight of pentaerythritol-tetrakis (3-(3,5-di-tert.butyl-4-hydroxy-phenyl)-propionate;
   0.01 to 0.06 percent by weight of sodium stearate;
   1.5 to 2 percent by weight of 3,4-epoxycyclohexylmethyl-3',4'-epoxycyclohexane carboxylate; and
   1 to 8 percent by weight of linear low density polyethylene;
wherein the melt volume flow rate as measured by ISO 1133 at 250° C. with 5 kg load and 300 s dwell time of the thermoplastic composition when subjected to 80° C. and 70 percent room humidity after 500 hours is between 52 and 62 $cm^3$/10 min, and the melt volume flow rate percent change compared to an initial melt volume flow rate of the thermoplastic composition is between 20 and 40 percent.

* * * * *